United States Patent
Kitaura

(10) Patent No.: US 11,643,113 B2
(45) Date of Patent: May 9, 2023

(54) TARGET IDENTIFICATION DEVICE AND DRIVING ASSISTANCE DEVICE

(71) Applicant: DENSO CORPORATION, Kariya (JP)

(72) Inventor: Kosuke Kitaura, Kariya (JP)

(73) Assignee: DENSO CORPORATION, Kariya (JP)

(*) Notice: Subject to any disclaimer, the term of this patent is extended or adjusted under 35 U.S.C. 154(b) by 247 days.

(21) Appl. No.: 16/872,236

(22) Filed: May 11, 2020

(65) Prior Publication Data

US 2020/0361491 A1 Nov. 19, 2020

(30) Foreign Application Priority Data

May 13, 2019 (JP) .............................. JP2019-090364

(51) Int. Cl.
*B60W 60/00* (2020.01)

(52) U.S. Cl.
CPC .. *B60W 60/0025* (2020.02); *B60W 60/00274* (2020.02); *B60W 2554/80* (2020.02)

(58) Field of Classification Search
CPC ....... B60W 60/0025; B60W 60/00274; B60W 2554/80; B60W 2050/0028; B60W 2420/42; B60W 2420/52; B60W 2420/54; B60W 30/0956; B60W 60/0017; B60W 2554/4041; B60W 50/0097; B60W 40/04
See application file for complete search history.

(56) References Cited

U.S. PATENT DOCUMENTS

| | | | | |
|---|---|---|---|---|
| 5,045,860 A | * | 9/1991 | Hodson | G01S 5/0009 342/465 |
| 6,553,130 B1 | * | 4/2003 | Lemelson | G08G 1/166 382/104 |
| 8,948,955 B2 | * | 2/2015 | Zhu | G05D 1/0055 701/23 |
| 9,494,694 B1 | * | 11/2016 | Dong | G01C 21/30 |
| 10,235,882 B1 | * | 3/2019 | Aoude | G08G 1/0137 |
| 11,257,340 B2 | * | 2/2022 | Fairweather | G08B 7/06 |
| 11,257,370 B2 | * | 2/2022 | Aoude | G08G 1/166 |
| 11,260,855 B2 | * | 3/2022 | Zhang | G08G 1/0104 |
| 2005/0100192 A1 | * | 5/2005 | Fujimura | G06V 10/143 382/103 |
| 2013/0033371 A1 | * | 2/2013 | Schliemann | G08G 1/165 340/435 |
| 2015/0006070 A1 | * | 1/2015 | Kim | G01S 7/4802 701/301 |
| 2015/0169956 A1 | * | 6/2015 | You | G06V 20/58 382/103 |

(Continued)

FOREIGN PATENT DOCUMENTS

| | | |
|---|---|---|
| JP | 2018-059884 A | 4/2018 |
| JP | 2018-066716 A | 4/2018 |

*Primary Examiner* — Peter D Nolan
*Assistant Examiner* — Anwar Mohamed
(74) *Attorney, Agent, or Firm* — Maschoff Brennan

(57) ABSTRACT

In a target identification device, an acquisition unit is configured to acquire trajectory information including information on a movement trajectory of a moving object in the surroundings of a vehicle. A calculation unit is configured to calculate a likelihood for each type of moving object from the trajectory information by using a plurality of models predefined for each type of moving object. A target identification unit is configured to identify the type of the moving object according to the likelihood calculated by the calculation unit.

9 Claims, 4 Drawing Sheets

(56) References Cited

U.S. PATENT DOCUMENTS

| | | | | |
|---|---|---|---|---|
| 2017/0120814 A1* | 5/2017 | Kentley | ................... | B60C 5/008 |
| 2017/0299707 A1* | 10/2017 | Nguyen | .................... | B60T 7/12 |
| 2019/0041218 A1* | 2/2019 | Hirata | .................... | G01C 22/00 |
| 2020/0272160 A1* | 8/2020 | Djuric | ................... | G01S 7/4808 |
| 2020/0355820 A1* | 11/2020 | Zeng | ....................... | G01S 7/417 |
| 2021/0316763 A1* | 10/2021 | Domahidi | ............ | B60W 40/105 |
| 2022/0017081 A1* | 1/2022 | Yokoyama | ............. | G06V 10/60 |
| 2022/0018680 A1* | 1/2022 | Hirano | ................ | B60W 60/001 |

* cited by examiner

TARGET IDENTIFICATION DEVICE AND DRIVING ASSISTANCE DEVICE

CROSS-REFERENCE TO RELATED APPLICATION

This application is based on and claims the benefit of priority from earlier Japanese Patent Application No. 2019-090364 filed May 13, 2019, the description of which is incorporated herein by reference.

BACKGROUND

Technical Field

The present disclosure relates to a target identification device and a driving assistance device.

Related Art

A target identification device has been known in which a type of a moving object is identified by using information detected by a sensor such as a radar.

DESCRIPTION OF SPECIFIC EMBODIMENT

Figure 1:
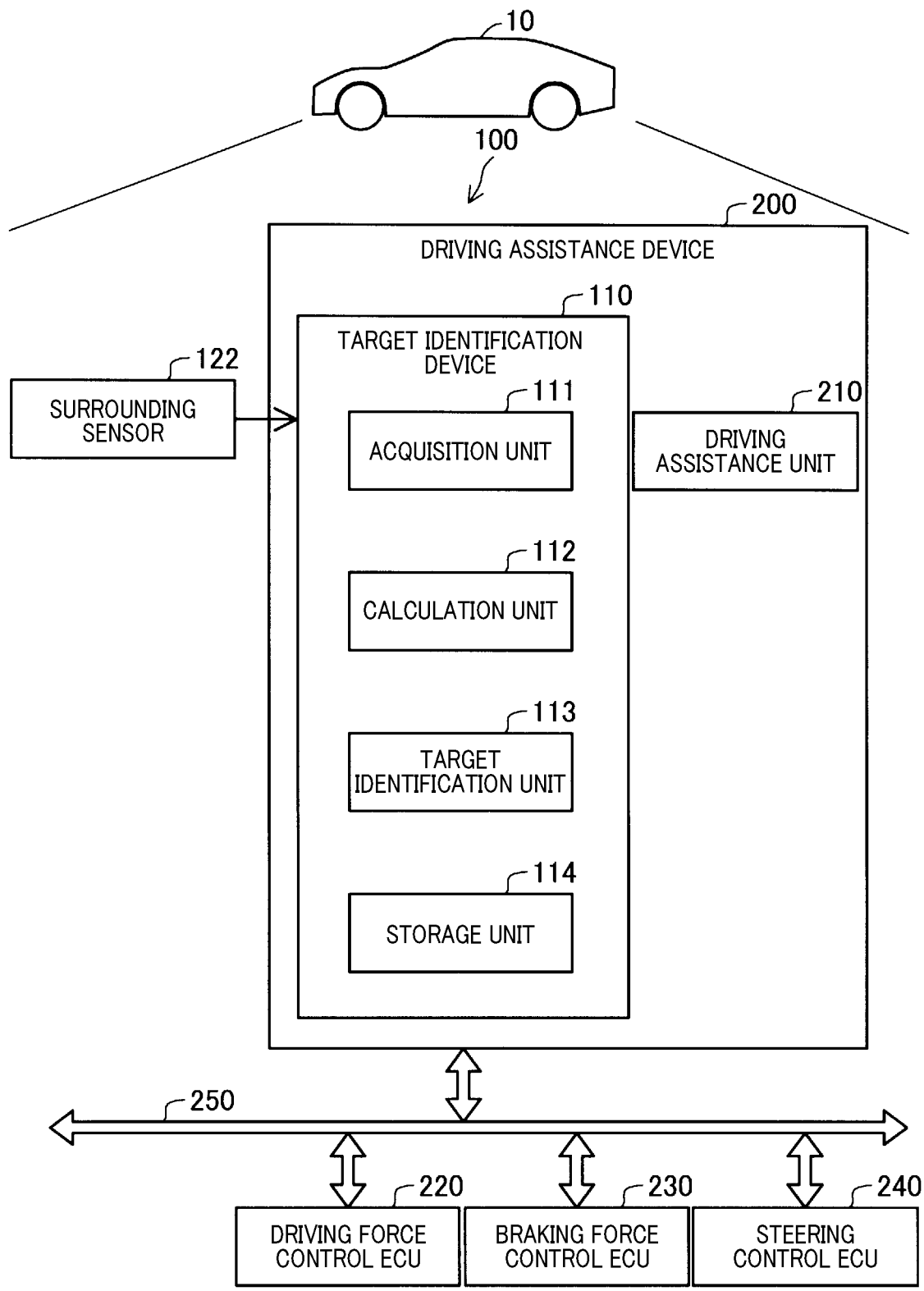
FIG. 1 is a schematic diagram showing a configuration of an automatic driving system.

As disclosed in, for example, JP-A-2018-59884, a type of a moving object is identified by using a speed of the moving object measured by a radar and an amount of change in the speed. However, the target identification device is not limited thereto.

It is desired to have a technique for more reliably identifying types of moving objects.

Hereinafter, exemplary embodiments of the present disclosure will be described in detail with reference to the accompanying drawings, in which like reference numerals refer to like or similar elements regardless of reference numerals and duplicated description thereof will be omitted.

A. First Embodiment

As shown in FIG. 1, a vehicle 10 includes an autonomous driving control system 100. In the present embodiment, the autonomous driving control system 100 includes a driving assistance device 200 including a target identification device 110 and a driving assistance unit 210, a surrounding sensor 122, a driving force control Electronic Control Unit (ECU) 220, a braking force control ECU 230, and a steering control ECU 240. The driving assistance device 200, the driving force control ECU 220, the braking force control ECU 230, and the steering control ECU 240 are connected to each other via an in-vehicle network 250.

The surrounding sensor 122 detects a situation in the surroundings of the vehicle 10. Examples of the surrounding sensor 122 include surrounding sensors using a reflected wave such as a laser radar, a millimeter wave radar, and an ultrasonic sensor. In the present embodiment, the surrounding sensor 122 is a millimeter wave radar.

The target identification device 110 includes an acquisition unit 111, a calculation unit 112, a target identification unit 113, and a storage unit 114. The target identification device 110 is composed of a microcomputer composed of a central processing unit (CPU), a RAM, and a ROM. The microcomputer executes a preinstalled program to implement functions of the components of the target identification device 110. However, some or all of the functions of the components may be implemented by a hardware circuit.

The acquisition unit 111 acquires trajectory information including information on a movement trajectory of a moving object in the surroundings of the vehicle 10 detected by the surrounding sensor 122. The "trajectory information" is information including positions of a moving object chronologically obtained. The acquisition unit 111 may acquire part or all of the information through inter-vehicle communication with another vehicle.

The calculation unit 112 calculates a likelihood for each type of moving object from the trajectory information by using a plurality of models predefined for each type of moving object. The "likelihood" is a value indicating a probability of an estimated value for each model, and a higher likelihood indicates a higher probability. In the present embodiment, the estimated value is, for example, future trajectory information, and is specifically a movement trajectory including a future estimated position of the moving object. Details of the calculation of the likelihood will be described later.

The target identification unit 113 identifies the type of the moving object according to the likelihood calculated by the calculation unit 112.

The storage unit 114 stores the models used by the calculation unit 112. The storage unit 114 does not need to be included in the target identification device 110. Instead of being stored in the storage unit 114, the models may be stored in a storage unit of the vehicle 10 or the like. The models are, for example, a motion model for the case where a pedestrian moves straight, a motion model for the case where a pedestrian turns, a motion model for the case where a vehicle moves straight, a motion model for the case where a vehicle turns, and the like. The models can be generated from the previously obtained observation data by using a neural network as machine learning. The models may be generated by performing a simulation or an experiment in advance.

The driving assistance unit 210 is composed of a microcomputer composed of a central processing unit (CPU), a RAM, and a ROM. The microcomputer executes a preinstalled program to implement a driving assistance function. For example, according to the future movement trajectory of the moving object estimated by the calculation unit 112 and the target type obtained by the target identification unit 113, the driving assistance unit 210 controls the driving force control ECU 220, the braking force control ECU 230, and the steering control ECU 240 to perform driving assistance.

The driving force control ECU 220 is an electronic control unit that controls an actuator, such as an engine, that generates a driving force of the vehicle. In the case of manual driving by a driver, the driving force control ECU 220 controls a power source, which is an engine or an electric motor, according to an amount of operation of an accelerator pedal. On the other hand, in the case of autonomous driving, the driving force control ECU 220 controls the power source according to a required driving force calculated by the driving assistance unit 210.

The braking force control ECU 230 is an electronic control unit that controls a brake actuator that generates a braking force of the vehicle. In the case of manual driving by the driver, the braking force control ECU 230 controls the brake actuator according to an amount of operation of a brake pedal. On the other hand, in the case of autonomous driving, the braking force control ECU 230 controls the brake actuator according to a required braking force calculated by the driving assistance unit 210.

The steering control ECU 240 is an electronic control unit that controls a motor that generates a steering torque of the vehicle. In the case of manual driving by the driver, the steering control ECU 240 controls the motor according to operation of a steering wheel to generate an assist torque for the steering operation. Thus, the driver can operate the steering with a small amount of power to steer the vehicle. On the other hand, in the case of autonomous driving, the steering control ECU 240 controls the motor according to a required steering angle calculated by the driving assistance unit 210 to steer the vehicle.

Figure 2:
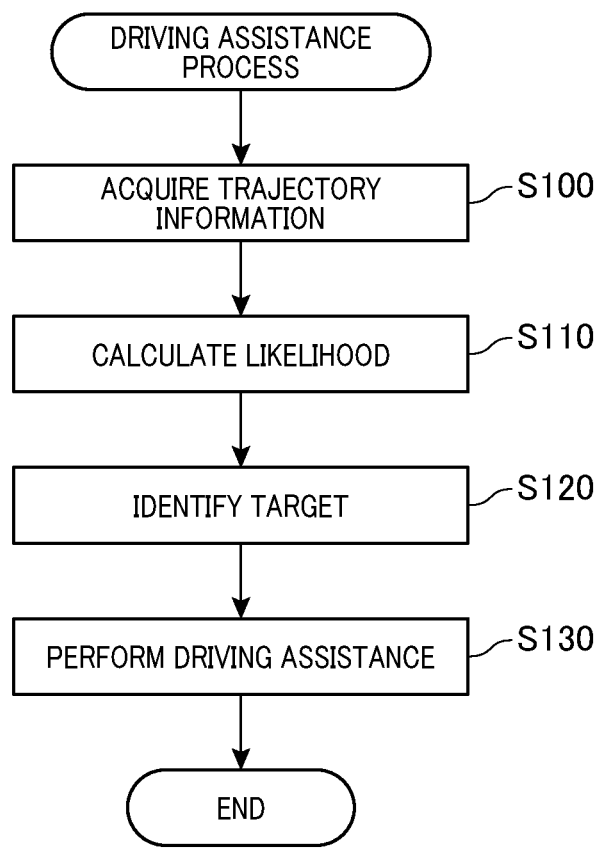
FIG. 2 is a flow chart showing a driving assistance process.

A driving assistance process shown in FIG. 2 is a series of process steps in which the target identification device 110 identifies a type of a moving object in the surroundings of the vehicle 10 and the driving assistance unit 210 performs driving assistance according to the result of the identification. This process is repeatedly performed by the driving assistance device 200 when, while the vehicle 10 is traveling, the target identification device 110 detects a moving object from information detected by the surrounding sensor 122.

First, at step S100, the acquisition unit 111 acquires trajectory information. More specifically, the acquisition unit 111 acquires trajectory information indicating a chronological movement trajectory of a moving object by using information detected by the surrounding sensor 122. The acquisition unit 111 may acquire trajectory information for each moving object by identifying an individual moving object using a known clustering technique in which a group of data detected by the surrounding sensor 122 are classified for each moving object.

Figure 3:
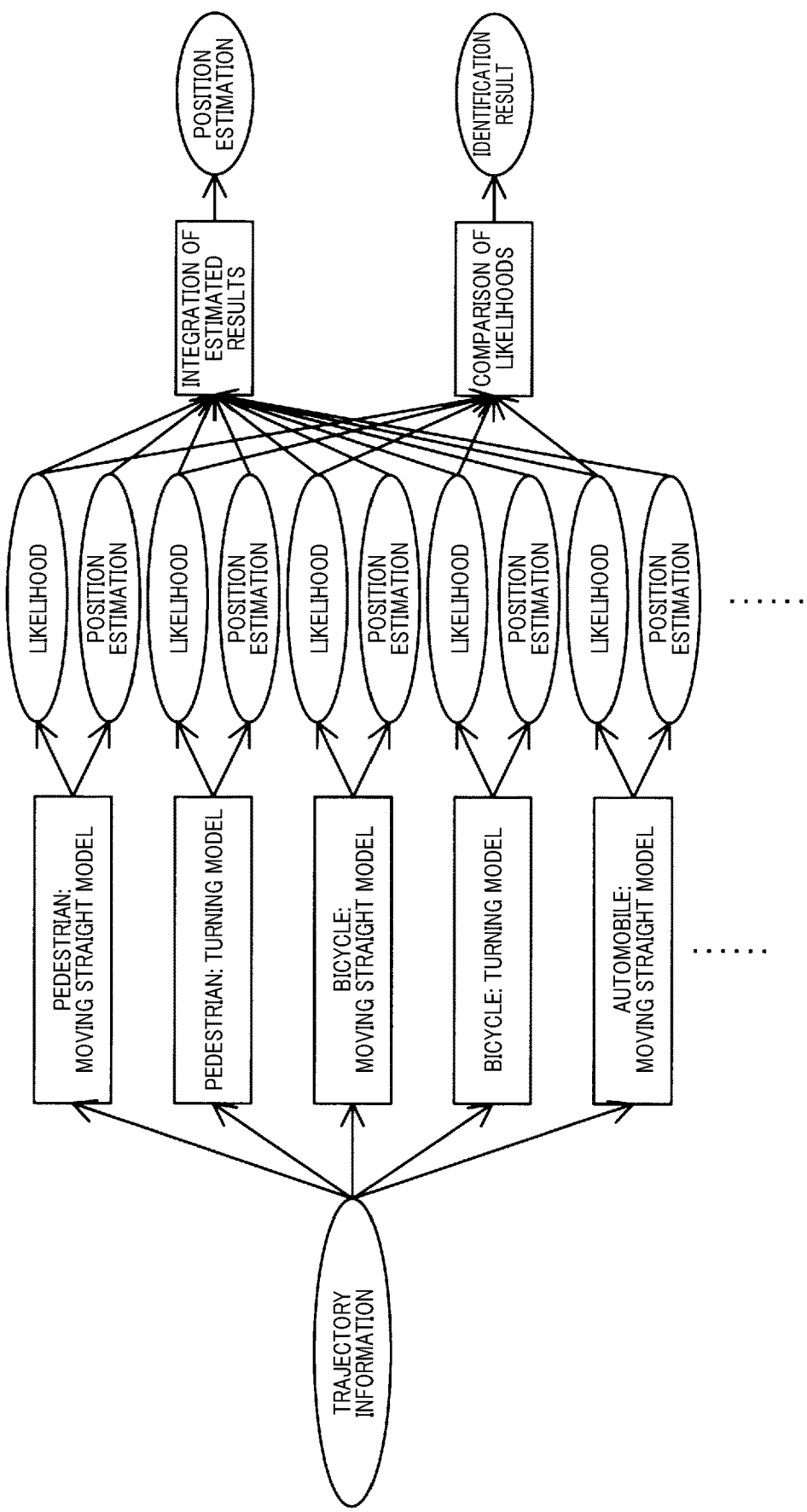
FIG. 3 is an explanatory diagram showing an example in which a likelihood is obtain from trajectory information.

Next, at step S110, the calculation unit 112 calculates a likelihood by using the trajectory information acquired at step S100 and the plurality of models recorded in the storage unit 114. The likelihood can be obtained, together with estimation of a movement trajectory of the moving object, for example, by using an Interacting Multiple Model (IMM) method which is a known state estimation method. More specifically, as shown in FIG. 3, by using the plurality of models that have been predefined for each type of moving object and recorded in the storage unit 114, the calculation unit 112 estimates a future state of the moving object for each type of moving object from the trajectory information acquired at step S100, and calculates a likelihood of the estimated movement trajectory. In the present embodiment, the "state of the moving object" is, for example, information such as a speed, a position, a size, and the like of the moving object. In order to calculate the likelihood, for example, a likelihood L can be obtained by the following formula (1).

$$L = \frac{1}{\sqrt{2\pi} |S|} \exp\left[-\frac{1}{2}(\tilde{Z})^T (S)^{-1} Z\right] \quad (1)$$

In formula (1), S represents a covariance of observation residual, the Z-tilde symbol represents an observation residual between an observed value which is a value of the trajectory information and an estimated value which is a value of the trajectory information estimated for each model, specifically, a value indicating the state of the moving object, and exp represents an exponential function.

Subsequently, at step S120, the target identification unit 113 identifies the type of the moving object by using the likelihood calculated at step S110. For example, the target identification unit 113 can identify, as the type of the moving object, a target indicated by the model having the highest likelihood. When the likelihoods of all the models are a predetermined threshold or less, the target identification unit 113 may determine that none of the targets indicated by the models corresponds to the type of the moving object.

Finally, at step S130, the driving assistance unit 210 performs driving assistance according to the future movement trajectory of the moving object estimated at step S110 and the type of the moving object identified at step S120. For example, the driving assistance unit 210 can perform control so that when a moving object in front of the vehicle 10 is a two-wheeled vehicle and turns left, the vehicle 10 travels on a right side of a lane. Furthermore, the driving assistance unit 210 can perform control so that when a moving object that is located in front of the vehicle 10 and is moving in the same direction as a direction of movement of the vehicle 10 is an automobile, the vehicle 10 travels following the automobile, and perform control so that when such a moving object is a bicycle, the vehicle 10 passes the bicycle.

According to the driving assistance device 200 of the present embodiment described above, the target identification unit 113 of the target identification device 110 can identify the type of the moving object according to the likelihood for each type of the moving object calculated from the trajectory information by the calculation unit 112. The type of the moving object can be identified by using only the trajectory information acquired from the surrounding sensor 122, thereby identifying the type of the moving object without using a camera. Furthermore, the driving assistance unit 210 can perform driving assistance according to the movement trajectory and the type of the moving object estimated by the target identification device 110, thereby achieving more appropriate driving assistance.

In a case where the acquisition unit 111 acquires trajectory information without performing clustering of a moving object, even when a plurality of moving objects are overlapped with each other, the type of the moving object can be accurately identified. For example, when the moving object is a crowd of pedestrians, if the crowd of pedestrians is considered as a single moving object and subjected to clustering, and one of the pedestrians moves in a direction opposite to a direction in which the other pedestrians move, it is difficult to identify the moving object as a pedestrian. However, when no clustering is performed, the acquisition unit 111 can acquire trajectory information including information on a movement trajectory of each of the pedestrians, thereby preventing each trajectory information from becoming noise and allowing accurate calculation of the likelihood.

B. Second Embodiment

Figure 4:
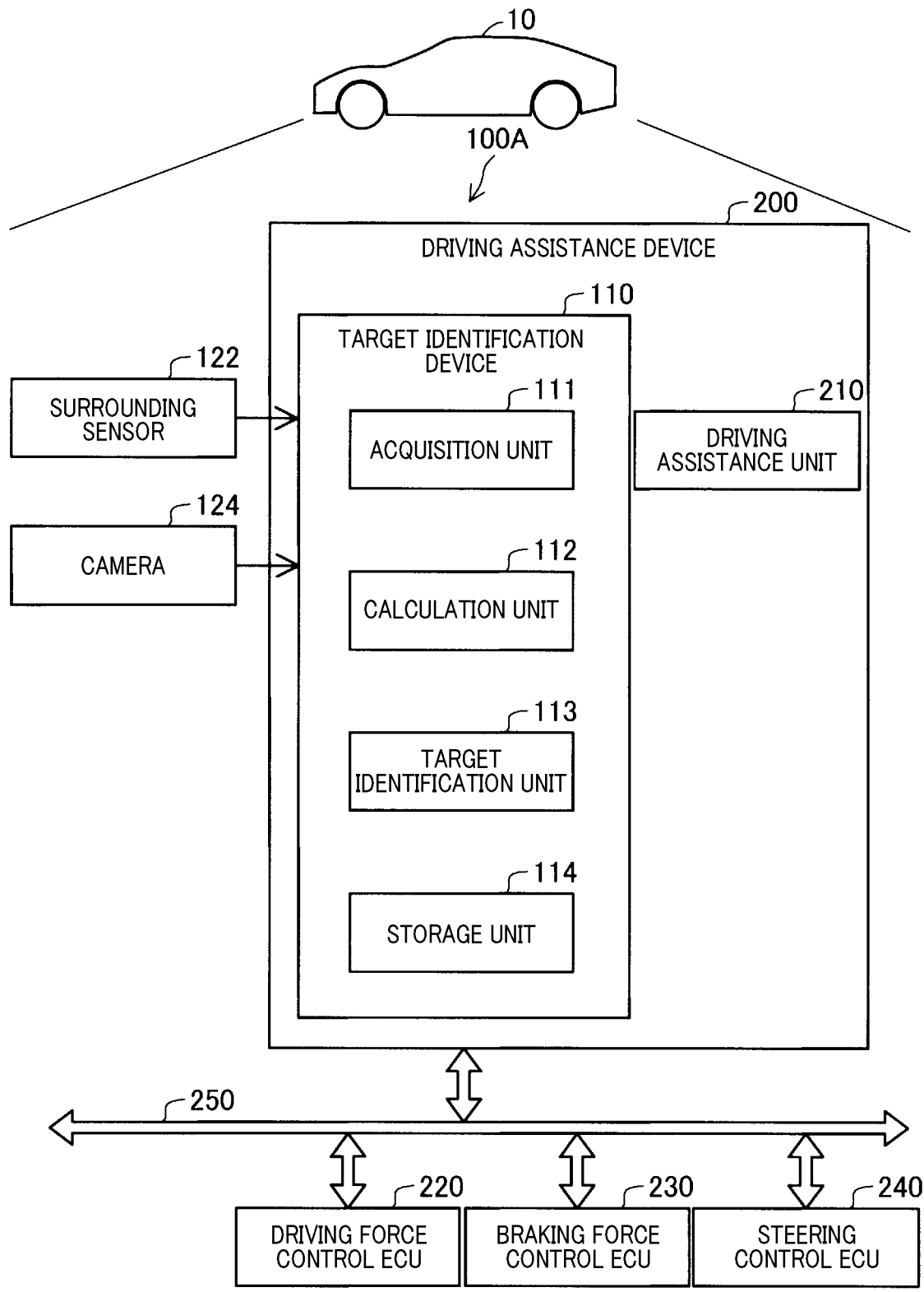
FIG. 4 is a schematic diagram showing a configuration of an autonomous driving system according to a second embodiment.

A configuration of an autonomous driving control system 100A according to a second embodiment shown in FIG. 4 differs from that of the autonomous driving control system of the first embodiment in that the autonomous driving control system 100A includes a camera 124, and the rest of the configuration is the same as that of the first embodiment. The camera 124 captures an image of the surroundings of the vehicle 10 to acquire the image. Examples of the camera 124 include a stereo camera and a monocular camera.

The acquisition unit 111 can acquire the image of the surroundings of the vehicle 10 captured by the camera 124. In the present embodiment, in addition to the likelihood, the target identification unit 113 uses the image of the surroundings of the vehicle 10 captured by the camera 124 to identify the type of the moving object. For example, when the target identification unit 113 cannot determine from the image of the surroundings of the vehicle 10 whether the moving object is a pedestrian or a bicycle, the target identification unit 113 can compare the likelihood of the model for the pedestrian with the likelihood of the model for the bicycle, and identify, as the type of the moving object, the model having a higher likelihood.

According to the driving assistance device 200 of the present embodiment described above, the target identification unit 113 of the target identification device 110 identifies the type of the moving object by using the image of the surroundings of the vehicle 10 captured by the camera 124 in addition to the likelihood for each type of the moving object calculated from the trajectory information by the calculation unit 112, thereby achieving more accurate identification of the type of the moving object.

Modifications

The present disclosure is not limited to the above embodiments, and can be implemented in various configurations without departing from the scope of the present disclosure. For example, in order to solve the above problem or to achieve some or all of the above effects, replacement or combination may be performed as appropriate in the technical features in the embodiments corresponding to the technical features in each embodiment described in Summary of the Disclosure. Unless the technical features are described as essential in the present specification, the technical features can be deleted as appropriate.

What is claimed is:

1. A target identification device comprising:
a non-transitory memory storing one or more computer programs; and
a processor executing the one or more computer programs to:
acquire trajectory information including information on a movement trajectory of a moving object in the surroundings of a vehicle;
using a plurality of models predefined for each respective type of moving object, estimate movement trajectories of the moving object corresponding to each of the respective type of moving objects, each of the estimated movement trajectories including a future state of the moving object, and calculate likelihoods of the estimated movement trajectories for each respective type of moving object; and
identify the type of the moving object according to the calculated likelihoods.

2. The target identification device according to claim 1, wherein the future state of the moving object includes a speed, a position, and a size of the moving object.

3. The target identification device according to claim 1, wherein the likelihood is calculated according to a following formula (1):

$$L = \frac{1}{\sqrt{2\pi}\,|S|}\exp\left[-\frac{1}{2}(\tilde{Z})^T(S)^{-1}Z\right] \quad (1)$$

where L represents the likelihood, S represents a covariance of observation residual, the Z-tilde symbol represents an observation residual between an observed value which is a value of the trajectory information and an estimated value which is a value of the trajectory information estimated for each model, and exp represents an exponential function.

4. The target identification device according to claim 1, wherein the processor executes the one or more computer programs to identify the type of the moving object by using the likelihood for each type of moving object calculated and an image of the surroundings of the vehicle.

5. The target identification device according to claim 4, wherein the processor executes the one or more computer programs to identify the type of the moving object in response to being unable to determine the type of the moving object from the image of the surroundings of the vehicle.

6. A driving assistance device comprising:
a non-transitory memory storing one or more computer programs; and
a processor executing the one or more computer programs to:
acquire trajectory information including information on a movement trajectory of a moving object in the surroundings of a vehicle;
using a plurality of models predefined for each of respective types of moving objects, estimate movement trajectories of the moving object corresponding to each of the respective types of moving objects, each of the estimated movement trajectories including a future state of the moving object, and calculate likelihoods of the estimated movement trajectories for each of the respective types of moving objects; and
identify the type of the moving object according to the calculated likelihoods; and
perform driving assistance by using the movement trajectory of the moving object estimated.

7. The driving assistance device according to claim 6, wherein the processor executes the one or more computer programs to perform driving assistance according to the type of the moving object identified.

8. The driving assistance device according to claim 6, wherein the future state of the moving object includes a speed, a position, and a size of the moving object.

9. A target identification method comprising:
acquiring trajectory information including information on a movement trajectory of a moving object in the surroundings of a vehicle;
by using a plurality of models predefined for each of respective types of moving objects, estimating the movement trajectory estimating movement trajectories of the moving object corresponding to each of the respective types of moving objects, each of the estimated movement trajectories including a future state of the moving object and calculating likelihoods of the estimated movement trajectories for each of the respective types of moving objects; and
identifying the type of the moving object according to the calculated likelihoods.

* * * * *